(12) United States Patent
Ramasubramonian et al.

(10) Patent No.: US 10,091,532 B2
(45) Date of Patent: Oct. 2, 2018

(54) BITSTREAM CONFORMANCE CONSTRAINTS IN SCALABLE VIDEO CODING

(71) Applicant: QUALCOMM Incorporated, San Diego, CA (US)

(72) Inventors: Adarsh Krishnan Ramasubramonian, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 14/749,533

(22) Filed: Jun. 24, 2015

(65) Prior Publication Data

US 2015/0382023 A1 Dec. 31, 2015

Related U.S. Application Data

(60) Provisional application No. 62/017,742, filed on Jun. 26, 2014.

(51) Int. Cl.
*H04B 1/66* (2006.01)
*H04N 7/12* (2006.01)
(Continued)

(52) U.S. Cl.
CPC .............. *H04N 19/70* (2014.11); *H04N 19/30* (2014.11); *H04N 19/50* (2014.11); *H04N 19/597* (2014.11)

(58) Field of Classification Search
CPC ........ H04N 19/30; H04N 19/50; H04N 19/70; H04N 19/597
(Continued)

(56) References Cited

U.S. PATENT DOCUMENTS

2013/0114741 A1* 5/2013 Sullivan ................. H04N 19/70
375/240.25
2013/0208792 A1* 8/2013 He ................... H04N 19/00569
375/240.12
(Continued)

OTHER PUBLICATIONS

Chen et al., ("High efficiency video coding (HEVC) scalable extension Draft 6", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16 ); URL: http://wftp3.itu.int/av-arch/jctvc-site/, No. JCTVC-O1008, Apr. 15, 2014 (Apr. 15, 2014), XP030116232).*

(Continued)

*Primary Examiner* — Tat C Chio
*Assistant Examiner* — Fabio S Lima
(74) *Attorney, Agent, or Firm* — Shumaker & Sieffert, P.A.

(57) ABSTRACT

An apparatus configured to code video information in a bitstream includes a memory and a processor in communication with the memory. The memory is configured to store video information associated with a first layer including a first picture and a second layer including a second picture, the first picture associated with a current access unit (AU). The processor is configured to determine whether the current AU satisfies a first condition associated with the first layer, and based on a determination that the current AU does not satisfy the first condition associated with the first layer, determine whether a difference between a highest picture order count (POC) and a lowest POC of a plurality of pictures in a decoded picture buffer (DPB) is less than a threshold value. The processor may encode or decode the video information in the bitstream.

30 Claims, 12 Drawing Sheets

(51) Int. Cl.
  *H04N 11/02* (2006.01)
  *H04N 11/04* (2006.01)
  *H04N 19/70* (2014.01)
  *H04N 19/30* (2014.01)
  *H04N 19/597* (2014.01)
  *H04N 19/50* (2014.01)

(58) Field of Classification Search
  USPC .................................................. 375/240.25
  See application file for complete search history.

(56) References Cited

U.S. PATENT DOCUMENTS

| | | |
|---|---|---|
| 2014/0086303 A1 | 3/2014 | Wang |
| 2014/0092213 A1 | 4/2014 | Chen et al. |
| 2014/0301463 A1 | 10/2014 | Rusanovskyy et al. |
| 2014/0301476 A1 | 10/2014 | Deshpande et al. |
| 2014/0301477 A1 | 10/2014 | Deshpande |
| 2015/0016503 A1 | 1/2015 | Rapaka et al. |
| 2015/0156501 A1* | 6/2015 | Hannuksela ............ H04N 19/70 375/240.12 |
| 2015/0264404 A1* | 9/2015 | Hannuksela ............ H04N 19/70 375/240.16 |
| 2015/0312580 A1* | 10/2015 | Hannuksela ............ H04N 19/70 375/240.02 |
| 2015/0319462 A1 | 11/2015 | Ramasubramonian et al. |
| 2016/0165247 A1 | 6/2016 | Deshpande et al. |
| 2016/0173887 A1 | 6/2016 | Deshpande |
| 2016/0191926 A1 | 6/2016 | Deshpande et al. |
| 2016/0241850 A1* | 8/2016 | Deshpande ............ H04N 19/70 |

OTHER PUBLICATIONS

Bross B., et al., "High Efficiency Video Coding (HEVC) text Specification draft 10 (for FDIS & Consent)," 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16), No. JCTVC-L1003, Jan. 17, 2013 (Jan. 17, 2013), 297 pages, XP030113948.

Chen J., et al., "High efficiency video coding (HEVC) scalable extension Draft 6", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16 ); URL: http://wftp3.itu.int/av-arch/jctvc-site/, No. JCTVC-Q1008, Apr. 15, 2014 (Apr. 15, 2014), 135 Pages, XP030116232.

International Search Report and Written Opinion—PCT/US2015/037720—ISA/EPO—Sep. 25, 2015.

Ramasubramonian A.K., et al., "MV-HEVC/SHVC HLS: Bitstream conformance restrictions in subclause C.4", 18. JCT-VC Meeting; Jun. 30, 2014-Sep. 7, 2014; Sapporo; (Joint Collaborative Team on Video Coding of ISO/IEC JTC1/SC29/WG11 and ITU-T SG.16); URL: http//wftp3.itu.int/av-arch/jctvc-site/, No. JCTVC-R0280, Jun. 26, 2014 (Jun. 26, 2014), XP030116593, pp. 1-3.

Sullivan G. J. et al., "Overview of the High Efficiency Video Coding (HEVC) Standard", IEEE Transactions on Circuits and Systems for Video Technology, Jan. 1, 2012 (Jan. 1, 2012), pp. 1-19, XP055045358, ISSN: 1051-8215, DOI: 10.1109/TCSVT.2012.2221191.

Sullivan G.J., "JCT-VC AHG report: Layered coding constraint specifications and capability indications (AHG10)", 18. JCT-VC Meeting; Jun. 30, 2014-Sep. 7, 2014; Sapporo; (Joint Collaborative Team on Video Coding of ISO/IEC JTC1/SC29/WG11 and ITU-T SG.16); URL: http://wftp3.itu.int/av-arch/jctvc-site/, No. JCTVC-R0010-v3, Jun. 20, 2014 (Jun. 20, 2014), 38 Pages, XP030116259.

Wang Y-K., et al., "MV-HEVC/SHVC HLS: Signalling and use of HRD parameters for bitstream partitions", 18. JCT-VC Meeting; Jun. 30, 2014-Sep. 7, 2014; Sapporo; (Joint Collaborative Team on Video Coding of ISO/IEC JTC1/SC29/WG11 and ITU-T SG.16 ); URL: http://wftp3.itu.int/av-arch/jctvc-site/, No. JCTVC-R0231, Jun. 22, 2014, XP030116533, 3 Pages.

Response to Written Opinion dated Sep. 25, 2015, from International Application No. PCT/US2015/037720, filed Apr. 22, 2016, 10 pp.

Second Written Opinion from International Application No. PCT/US2015/037720, dated Jun. 8, 2016, 7 pp.

Response to Second Written Opinion dated Jun. 8, 2016, from International Application No. PCT/US2015/037720, filed Aug. 3, 2016, 18 pp.

International Preliminary Report on Patentability from International Application No. PCT/US2015/037720, dated Sep. 6, 2016, 12 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

* cited by examiner

| | AU | | 1030 | 1040 | 1050 | 1060 |
|---|---|---|---|---|---|---|
| W/O RESET | LSB | EL | 112 | 113 | 114 | 115 |
| | | BL | 112 | 0 | 1 | 2 |
| | MSB | EL | 1 | 1 | 1 | 1 |
| | | BL | 1 | 0 | 0 | 0 |
| W/ RESET | LSB | EL | 112 | 0 | 1 | 2 |
| | | BL | 112 | 0 | 1 | 2 |
| | MSB | EL | 1 | 0 | 0 | 0 |
| | | BL | 1 | 0 | 0 | 0 |

BITSTREAM CONFORMANCE CONSTRAINTS IN SCALABLE VIDEO CODING

INCORPORATION BY REFERENCE TO PRIORITY APPLICATIONS

This application claims priority to U.S. Provisional No. 62/017,742, filed Jun. 26, 2014.

TECHNICAL FIELD

This disclosure relates to the field of video coding and compression, particularly to scalable video coding, multiview video coding, or three-dimensional (3D) video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by Moving Picture Experts Group-2 (MPEG-2), MPEG-4, International Telegraph Union-Telecommunication Standardization Sector (ITU-T) H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

The systems, methods and devices of this disclosure each have several innovative aspects, no single one of which is solely responsible for the desirable attributes disclosed herein.

In one aspect, an apparatus configured to code (e.g., encode or decode) video information in a bitstream includes a memory and a processor in communication with the memory. The memory is configured to store video information associated with a plurality of video layers in the bitstream, the plurality of video layers in the bitstream divided into a plurality of bitstream partitions, wherein each bitstream partition contains at least one of the plurality of video layers. The processor is configured to process a bitstream conformance parameter associated with a first bitstream partition of the plurality of bitstream partitions, wherein the bitstream conformance parameter is applicable to the first bitstream partition but not to another portion of the bitstream not encompassed by the first bitstream partition.

In another aspect, a method of coding video information in a bitstream includes processing a bitstream conformance parameter associated with a first bitstream partition of a plurality of bitstream partitions, each bitstream partition containing at least one of a plurality of video layers in the bitstream, wherein the bitstream conformance parameter is applicable to the first bitstream partition but not to another portion of the bitstream not encompassed by the first bitstream partition.

In another aspect, a non-transitory computer readable medium contains code that, when executed, causes an apparatus to: store video information associated with a plurality of video layers in the bitstream, the plurality of video layers in the bitstream divided into a plurality of bitstream partitions, wherein each bitstream partition contains at least one of the plurality of video layers; and process a bitstream conformance parameter associated with a first bitstream partition of the plurality of bitstream partitions, wherein the bitstream conformance parameter is applicable to the first bitstream partition but not to another portion of the bitstream not encompassed by the first bitstream partition.

In another aspect, a video coding device configured to code video information in a bitstream includes: means for storing video information associated with a plurality of video layers in the bitstream, the plurality of video layers in the bitstream divided into a plurality of bitstream partitions, wherein each bitstream partition contains at least one of the plurality of video layers; and means for processing a bitstream conformance parameter associated with a first bitstream partition of the plurality of bitstream partitions, wherein the bitstream conformance parameter is applicable to the first bitstream partition but not to another portion of the bitstream not encompassed by the first bitstream partition.

DETAILED DESCRIPTION

Figure 1A:
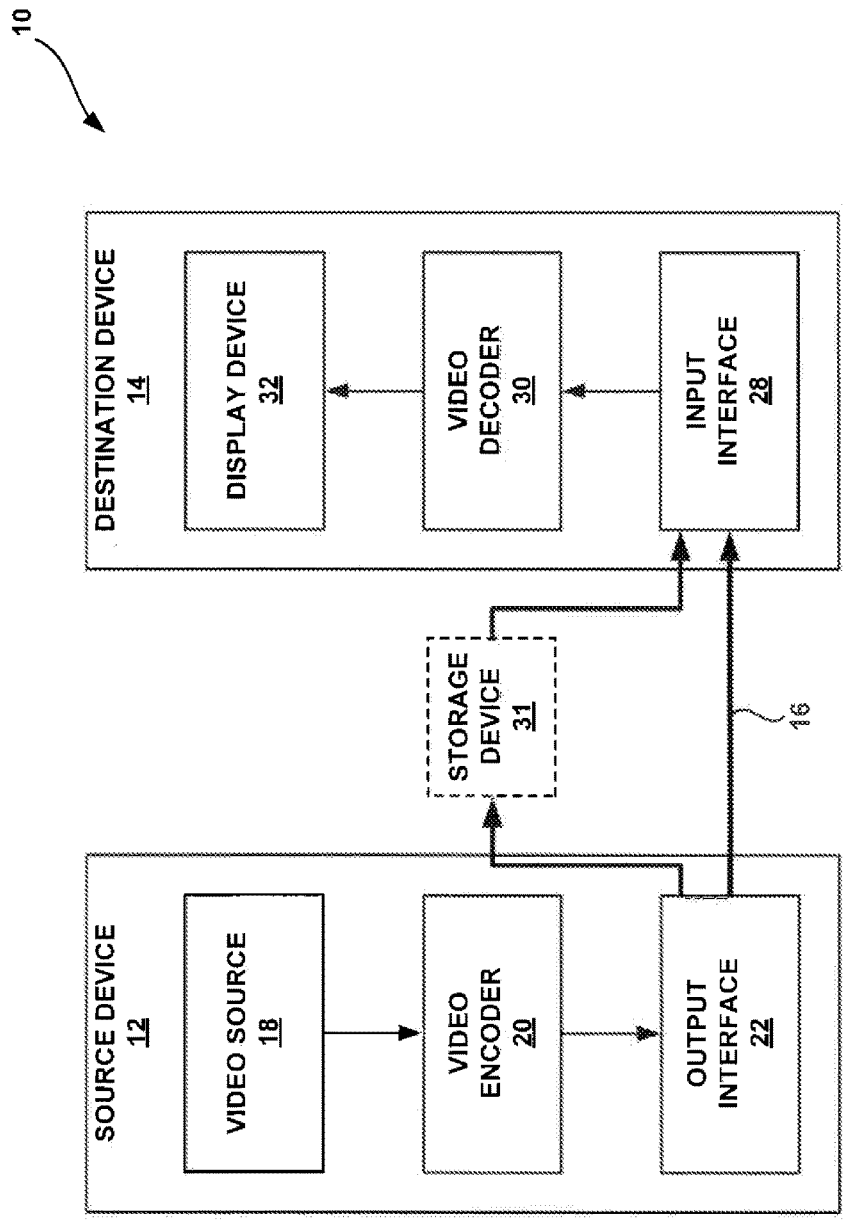
FIG. 1A is a block diagram illustrating an example video encoding and decoding system that may utilize techniques in accordance with aspects described in this disclosure.

In some implementations, various parameters related to bitstream conformance are signaled in the bitstream, where certain bitstream conformance constraints may restrict the values specified by such parameters. For example, such parameters may specify timing information associated with the pictures coded in the bitstream or other characteristics of the bitstream or a portion thereof (e.g., coding units, pictures, video layers, etc.). In existing implementations, these parameters are often associated with the entire bitstream or the entire access unit (e.g., all pictures in the bitstream that correspond to the same output time instance).

In some situations, it may be desirable to transport or process the bitstream (or the access units) in smaller units. However, having bitstream conformance parameters and constraints that are applicable to the entire bitstream (e.g., all the layers in the bitstream) or entire access units (e.g., all the pictures in the access unit) may complicate the process for partitioning the bitstream and processing some or all of the partitions independently.

Thus, an improved method for defining and processing various bitstream conformance parameters in a bitstream is desired.

In the present disclosure, various techniques for defining and processing bitstream conformance parameters that are inferred or signaled in the bitstream are described. In some embodiments of the present disclosure, the coder processes a bitstream conformance parameter associated with a bitstream partition that includes a subset of a plurality of video layers in the bitstream. In such embodiments, the bitstream conformance parameter may be applicable to the bitstream partition but not to another portion of the bitstream not encompassed by the bitstream partition. By processing the bitstream conformance parameter associated with a bitstream partition and not the entire bitstream, greater flexibility in transporting and processing the bitstream may be achieved.

In the description below, H.264/Advanced Video Coding (AVC) techniques related to certain embodiments are described; the HEVC standard and related techniques are also discussed. While certain embodiments are described herein in the context of the HEVC and/or H.264 standards, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector T) H.261, International Organization for Standardization/International Electrotechnical Commission (ISO/IEC) MPEG-1 Visual, ITU-T H.262 or ISO/IEC MPEG-2 Visual, ITU-T H.263, ISO/IEC MPEG-4: Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types, of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as a BL, and a higher layer such as an EL) of video data. A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. For example, a view of video data may be referred to as a layer of video data, and a layer of video data may be referred to as a view of video data. In addition, a multi-layer code also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple BLs, RLs, and/or ELs. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the slicer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261 ISO/IEC MPEG-I Visual, ITU-T H.262 or ISO/IEC MPEG-2 Visual, ITU-T H.263, ISO/TEC MPEG-4 Visual and ITU-T H.264 (also known as ISO/TEC MPEG-4 AVC), and HEVC, including its Scalable Video Coding (SVC) and Multiview Video Coding (MVC) extensions.

In addition, a video coding standard, namely HEVC, is being developed by the Joint Collaboration Team on Video Coding (JCT-VC) of ITU-T VCEG and ISO/IEC MPEG. The full citation for the HEVC Draft 10 is document JCTVC-L1003, Bross et al, "High Efficiency Video Coding (HEVC) Text Specification Draft 10," Joint Collaborative Team on Video Coding (JC-VC) of ITU-T SG16 WP3 and ISO/IEC JTC1/SC29/WG11, 12th Meeting Geneva, Switzerland, Jan. 14, 2013 to Jan. 23, 2013. The multiview extension to HEVC, namely MV-HEVC and the scalable extension to HEVC, named SHVC, are also being developed by the JCT-3V (ITU-T/ISO/IEC Joint Collaborative Team on 3D Video Coding Extension Development) and JCT-VC, respectively.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding in addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
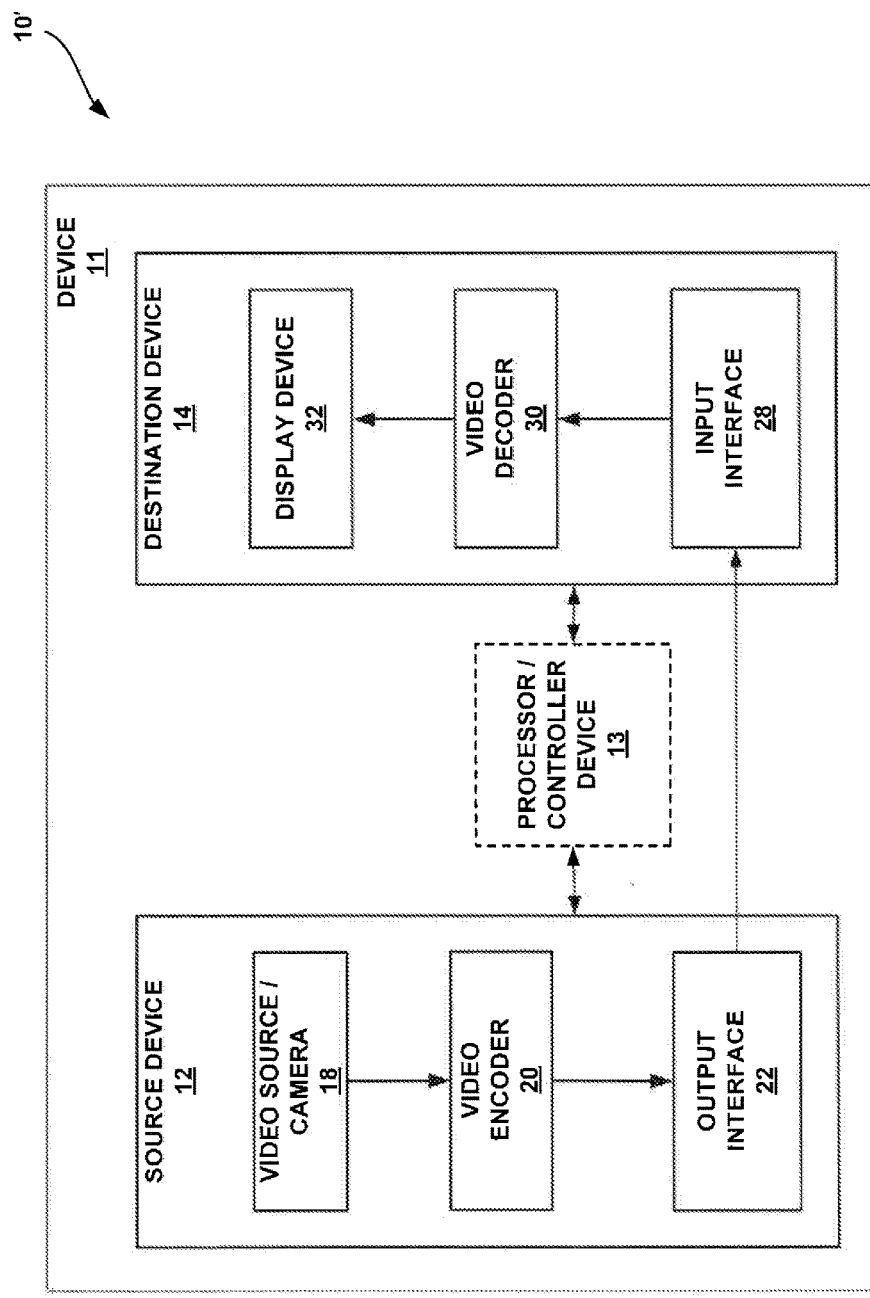
FIG. 1B is a block diagram illustrating another example video encoding and decoding system that may perform techniques in accordance with aspects, described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set top boxes, telephone handsets such as so-called "smart" phones, so-called "smart" pads, televisions, cameras, display devices, digital media players, video gaming, consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source. device 12 to the destination device 14.

Alternatively, encoded data may be output from an output interface 22 to a storage device 31 (optionally present). Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device al may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, a video encoder 20, and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video torn a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2 or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. Video decoder 30 illustrated in FIGS. 1A and 1B may comprise video decoder 30 illustrated FIG. 3A, video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a controller/processor device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as HEVC, and may conform to a HEVC Test Model (HM). Alternatively, the video encoder 20 and the video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUR units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decodes in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate as coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be as CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with as maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data residual video blocks) associated with transform units (TUs) of the CU. Each TU of a CU may be associated with a different residual video block.

The video encoder 20 may apply one or more transforms to residual video blocks associated with the its to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated With the CU.

After the video en coder 20 quantizes a transform coefficient block the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context-adaptive variable-length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, SEI, an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2A:
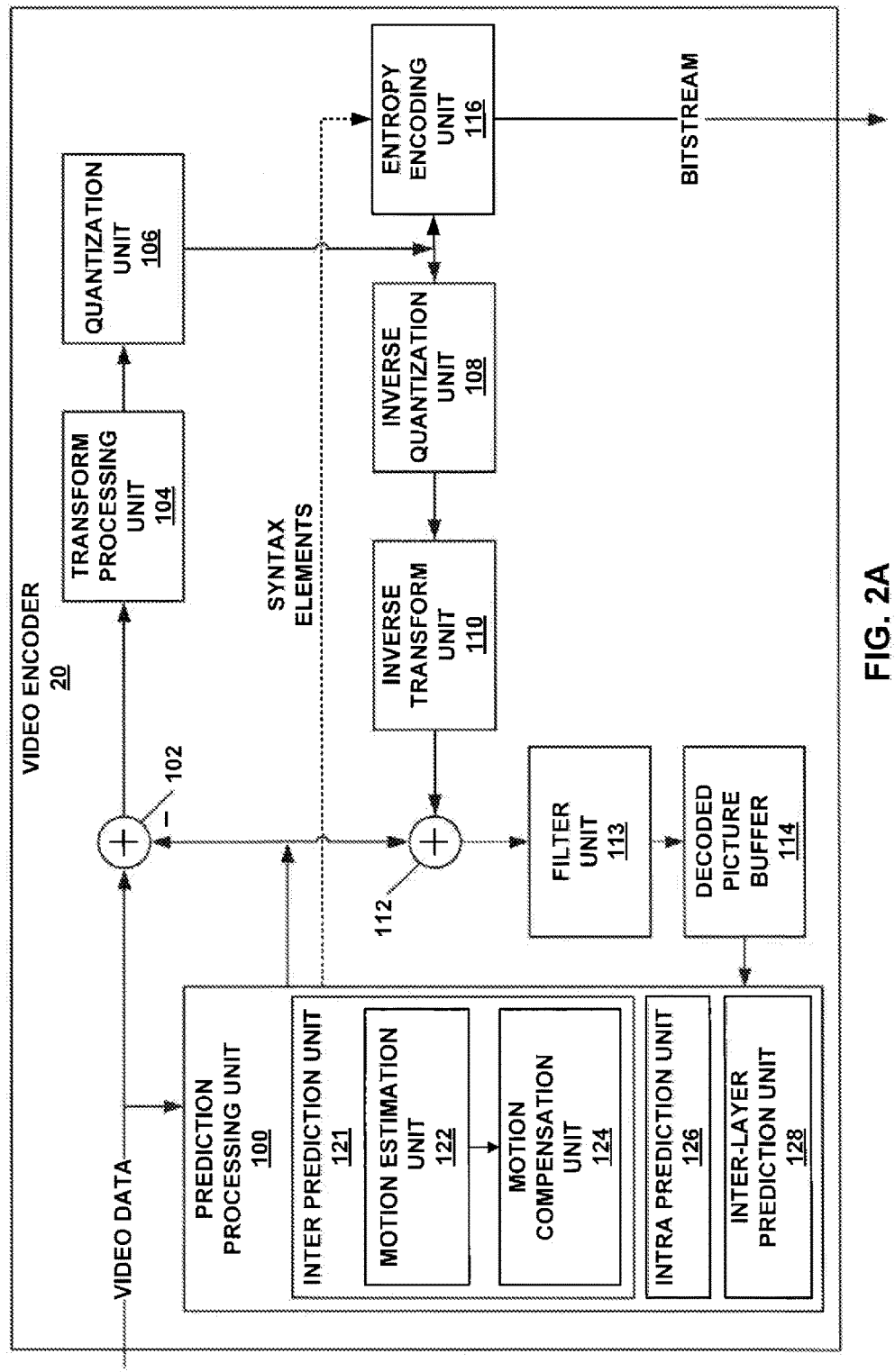
FIG. 2A is a block diagram illustrating an example of a video encoder that may implement techniques in accordance with aspects described in his disclosure.

FIG. 2A is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure. In some examples, the techniques described in this disclosure may be shared among, the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of video encoder 20 may be duplicated for processing of a multilayer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110 a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2A separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video, block of the treeblock into four sub-blocks, the root node has four child nodes, in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of Which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the ICU is in an I slice, motion estimation unit 122 and motion compensation unit 124 do not perform inter prediction on the PU.

If the is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation trait 122 may search the reference pictures of list 0 or list 1 for a reference block for the PU. Motion estimation unit 122 may then generate a reference index that indicates the reference picture in list 0 or list 1 that contains the reference block and a motion vector that indicates a displacement between the PU and the reference block Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As part of performing an encoding operation on a CU, intra prediction unit 126 may perform infra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SHVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer.

Inter-layer residual prediction uses the residue of the base layer to predict the residue of the enhancement layer.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest titrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to pert intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
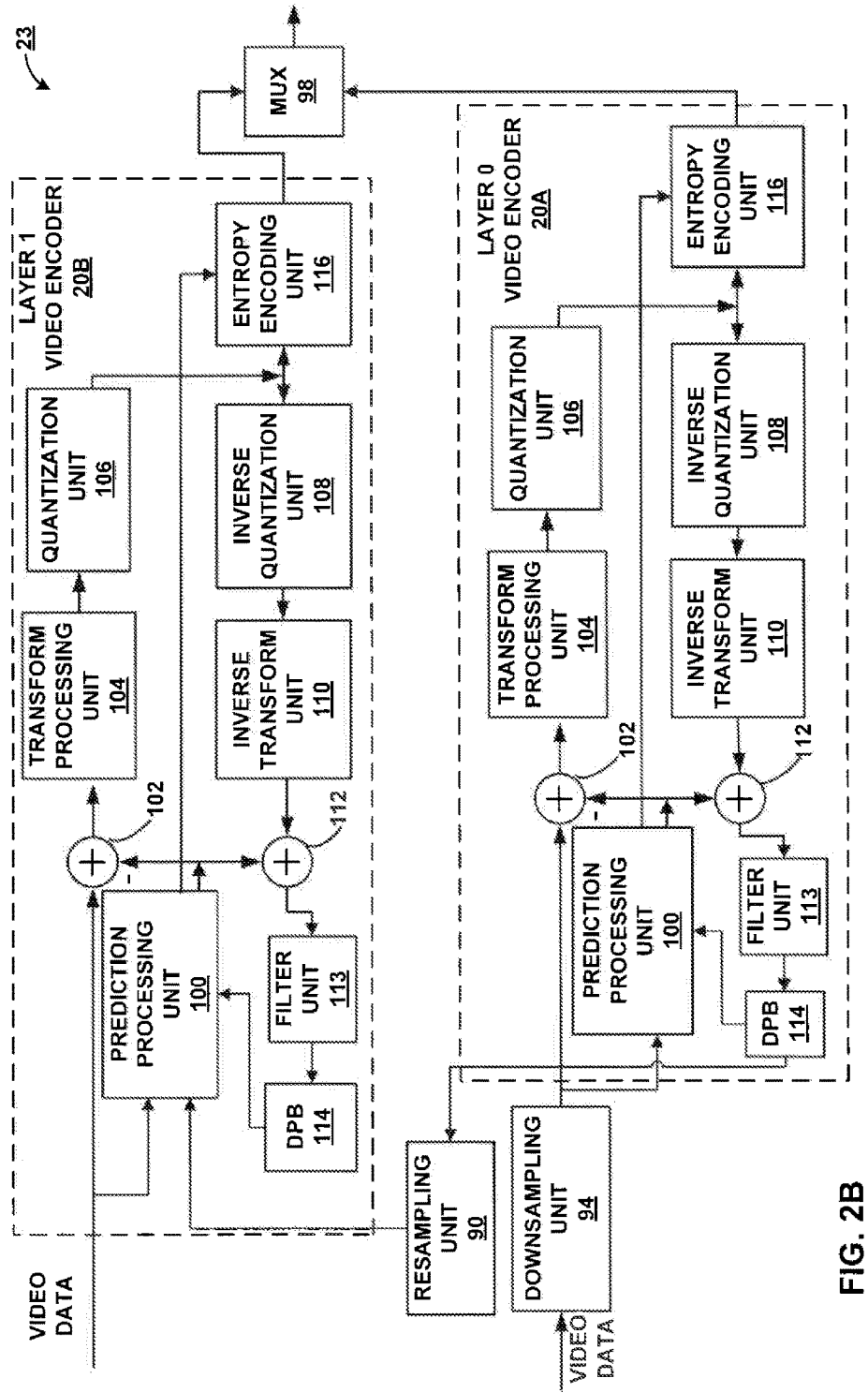
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. Video encoder 23 may be configured to process multi-layer video frames, such as for SHVC and multiview coding. Further, video encoder 23 may be configured to perform any or all of the techniques of this disclosure.

Video encoder 23 includes a video encoder 20A and video encoder 20B, each of which may be configured as video encoder 20 and may perform the functions described above with respect to video encoder 20. Further, as indicated by the reuse of reference numbers, video encoders 20A and 20B may include at least some of the systems and subsystems as video encoder 20. Although video encoder 23 is illustrated as including two video encoders 20A and 20B, video encoder 23 is not limited as such and may include any number of video encoder 20 layers. In some embodiments, video encoder 23 may include a video encoder 20 for each picture or frame in an access unit. For example, an access unit that includes five pictures may be processed or encoded by a video encoder that includes five encoder layers. In some embodiments, video encoder 23 may include more encoder layers than frames in an access unit. In some such cases, some of the video encoder layers may be inactive when processing some access units.

In addition to video encoders 20A and 20R, video encoder 23 may include an resampling unit 90. The resampling unit 90 may, in some cases, upsample a BL of a received video frame to, for example, create an EL. The resampling unit 90 may upsample particular information associated with the received BL of a frame, but not other information. For example, the resampling unit 90 may upsample the spatial size or number of pixels of the BL, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a BL, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., video encoder 20A) and to upsample the picture (or the received picture information). This upsampled picture may then be provided to the prediction processing unit 100 of a higher byes encoder (e.g., video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of video encoder 20A may be provided directly, or at least without being provided to the resampling unit 90, to the prediction processing unit 100 of video encoder 20B. For example, if video data provided to video encoder 20B and the reference picture from the decoded picture buffer 114 of video encoder 20A are of the same size or resolution, the reference picture may be provided to video encoder 20B without any resampling.

In some embodiments, video encoder 23 downsamples video data to be provided to the lower layer encoder using the downsampling unit 94 before provided the video data to video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, video encoder 23 may further include a multiplexor 98, or mux. The mux 98 can output a combined bitstream from video encoder 23. The combined bitstream may be created by taking a bitstream from each of video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of video encoders 20A and 20B. For instance, two blocks may be output from video encoder 20B for each block output from video encoder 20A. In some embodiments, the output stream from the mux 98 may be preprogrammed. In other embodiments, the mux 98 may combine the bitstreams from video encoders 20A, 20B based on a control signal received from a system external to video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from video encoder 23.

Video Decoder

Figure 3A:
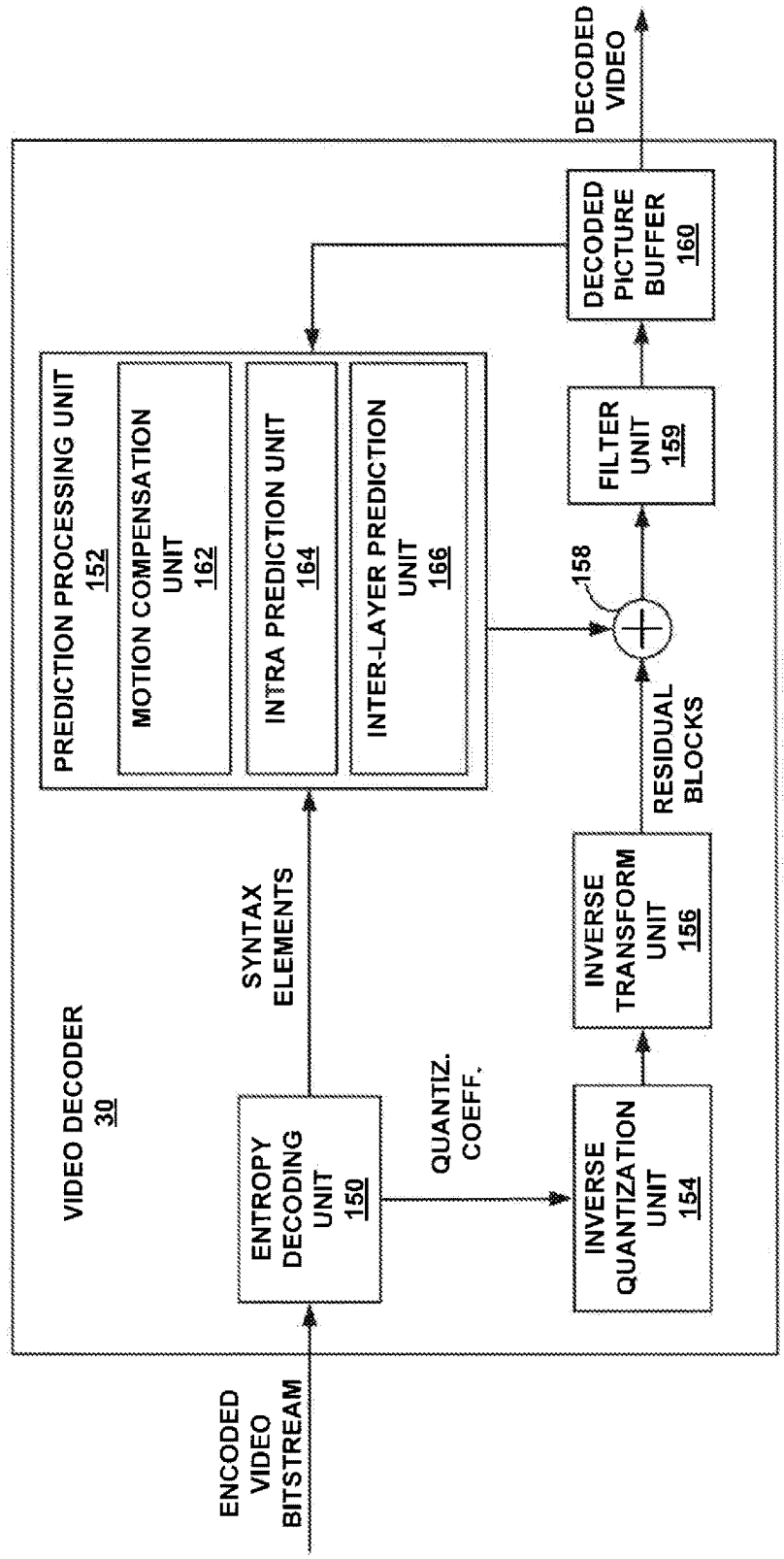
FIG. 3A is a block diagram illustrating an example of a video decoder that may implement techniques in accordance with aspects described in this disclosure.

FIG. 3A is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure. In some examples, the techniques described in this disclosure may be shared among the various components of the video decoder 30. In some examples, additionally or alternatively, a processor (not shown) may be configured to perform any or all of the techniques described in this disclosure For purposes of explanation, this disclosure describes the video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of video decoder 30 may be duplicated for processing of a multi-layer codec.

In the example of FIG. 3A, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to video encoder 20 of FIG. 2A. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded, slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a re-construction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the infra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the enhancement layer) using one or more different layers that are available in SHVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual Video block.

After reconstruction unit 158, reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Multi-Layer Decoder

Figure 3B:
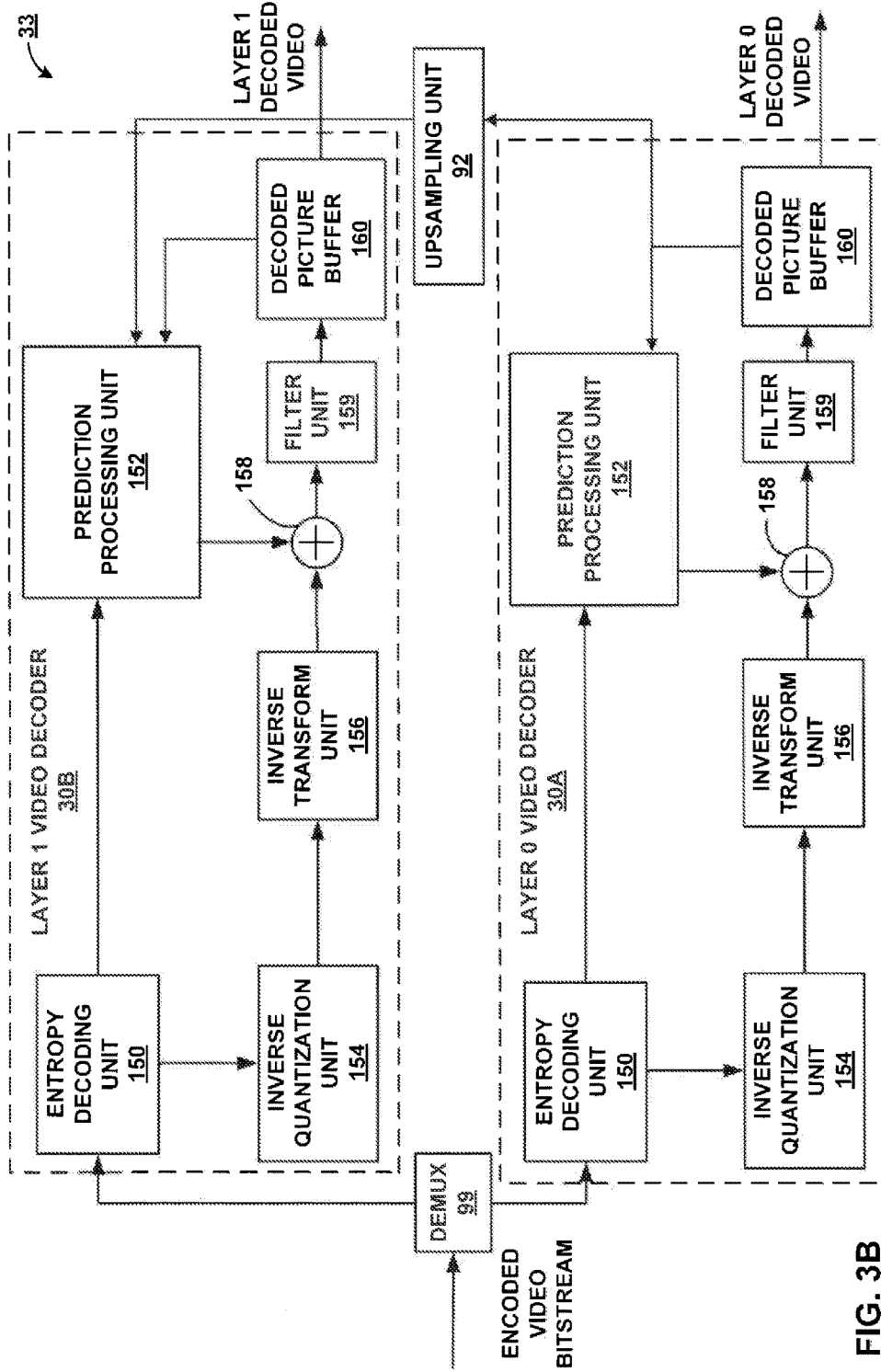
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. Video decoder 33 may be configured to process multi-layer video frames, such as for SHVC and multiview coding. Further video decoder 33 may be configured to perform any or all of the techniques of this disclosure.

Video decoder 33 includes a video decoder 30A and video decoder 30B, each of Which may be configured as video decoder 30 and may perform the functions described above with respect to video decoder 30. Further, as indicated by the reuse of reference numbers, video decoders 30A and 30B may include at least some of the systems and subsystems as video decoder 30. Although video decoder 33 is illustrated as including two video decoders 30A and 30B, video decoder 33 is not limited as such and may include any number of video decoder 30 layers. In some embodiments, video decoder 33 may include a video decoder 30 for each picture or frame in an access unit. For example, an access unit that includes five pictures may be processed or decoded by a video decoder that includes five decoder layers. In some embodiments, video decoder 33 may include more decoder layers than frames in an access unit. In some such cases, some of the video decoder layers may be inactive when processing some access units.

In addition to video decoders 30A and 30B, video decoder 33 may include an upsampling unit 92. In some embodiments, the upsampling unit 92 may upsample a BL of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., video decoder 30A) and to upsample the picture (or the received picture information). This upsampled picture may then be provided to the prediction processing unit 152 of a higher layer decoder (e.g., video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of video decoder 30A may be provided directly, or at least without being provided to the upsampling unit 92, to the prediction processing unit 152 of video decoder 30B. For example, if video data provided to video decoder 30B and the reference picture from the decoded picture buffer 160 of video decoder 30A are of the same size or resolution, the reference picture may be provided to video decoder 30B without upsampling. Further, in some embodiments, the upsampling unit 92 may be a resampling unit 90 configured to upsample or downsample a reference picture received from the decoded picture buffer 160 of video decoder 130A.

As illustrated in FIG. 3B, video decoder 33 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of video decoders 30A and 30B receives a portion of the bitstream at a given time. While in some cases the bits from the bitstream received at the demux 99 may be alternated one bit at a time between each of video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of video decoders 30A and 30B. For instance, two blocks may be provided to video decoder 30B for each block provided to video decoder 30A. In some embodiments, the division of the bitstream by the demux 99 may be preprogrammed. In other embodiments, the demux 99 may divide the bitstream based on a control signal received from a system external to video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by video decoder 33.

Bitstream Conformance Constraints

Video coding standards may specify bitstream conformance constraints that a bitstream conforms to such standards should follow. In other words, to have a bitstream (e.g., conforming bitstream) that conforms to a standard, the bitstream needs to satisfy all the bitstream conformance constraints specified by the standard. In some video coding standards, a conforming bitstream is said to be decoded by a hypothetical decoder that is conceptually connected to the output of an encoder. Such a hypothetical decoder may consist of a decoder buffer, a decoder, and/or a display unit. This hypothetical decoder is sometimes referred to as a hypothetical reference decoder (THIRD) in existing coding schemes (e.g., H.264, HEVC, etc.), The bitstream conformance constraints of a given standard ensure that the encoder will generate a bitstream that can be properly decoded by any decoder that conforms to the given standard.

The bitstream conformance constraints can be used by any entity that desires to test whether a particular bitstream conforms to a standard. For example, such an entity may be on the encoder side (e.g., a content provider may wish to make sure that the bitstream being generated and sent out indeed conforms to the standard, since if the bitstream does not conform to the standard, the bitstream may not be properly decodable by a conforming decoder) or on the decoder side (e.g., since a decoder cannot be said to be a conforming decoder unless the decoder is able to decode all bitstreams that conform to the standard, it may be desirable for a decoder or an entity on the decoder side to test whether a given bitstream satisfies one or more bitstream conformance constraints specified by a given standard) or a network entity (e.g., a network box entity may receive a bitstream and only forward it to other entities after ascertaining that the bitstream is a conforming bitstream by checking that the bitstream conformance constraints are valid).

Bitstream Partitions

As discussed above, a bitstream may contain more than one video layer (e.g., BL, EL, etc.). In some implementations, the bitstream may be divided into multiple bitstream partitions, where each bitstream partition includes at least one video layer in the bitstream. For example, if a bitstream has Layers A, B, and C, the bitstream may be divided into Partitions X and Y, where Partition X includes Layers A and B, and Partition Y includes Layer C. The way in which the video layers are divided into one or more bitstream partitions may be referred to as a partitioning scheme. For example, an encoder may specify one or more partitioning schemes for the bitstream (e.g., by specifying parameters associated with each partitioning scheme). In some embodiments, the bitstream may include at least two bitstream partitions.

Similarly, a bitstream may contain a plurality of access units (AU's), where each AU contains pictures in the bitstream that correspond to the same output time instance. If the bitstream contains one or more bitstream partitions, the portion (e.g., a set of pictures) of the AU that belongs to a single bitstream partition may be referred to as a partition unit. In other words, the partition unit may be a subset of the AU, where the partition unit contains pictures of a bitstream partition that correspond to the same output time instance. In some implementations, a partition unit includes video coding layer (VCL) network abstraction layer (NAL) units of an AU that belong to the layers contained in the bitstream partition and their associated non-VCL NAL units. For example, a NAL unit may be a unit of transport that includes a raw byte sequence payload (RBSP) and a NAL unit header.

Transporting Bitstream Partitions

In some existing coding schemes, the entire bitstream is transported together in a single pipeline. The pictures in the bitstream are stored in a coded picture buffer (CPB), output to a decoder, and stored in a decoded picture buffer (DPB).

Partitioning a bitstream into multiple bitstream partitions can provide coding flexibility in that the resulting bitstream partitions need not be transported together in a single bitstream and can be transported independently. For example Layers A and B in the above example may be transported in a different bitstream than a bitstream in which Layer C is transported. However, certain bitstream conformance constraints refer to access units, which contain all the pictures in the entire bitstream (e.g., Layers, B, and C) that correspond to the same output time instance. Such bitstreams may become meaningless or improper if not all of the bitstream partitions belonging to the bitstream are transported together. For example, when some of the video layers in the bitstream are transported separately or independently, it may no longer be proper to specify parameters such as picture rate, arrival time, etc. for the entire bitstream or access units contained therein because the entire bitstream (or entire AUs) are no longer received together or in a single bitstream. Indeed, one or more bitstream partitions may be sent to different bitstream partition buffers (BPBs), and the bitstream partitions may be decoded together by a single decoder or decoded separately by multiple decoders. Thus, in such embodiments these bitstream conformance parameters should be specified for each bitstream partition or each partition unit contained therein.

Figure 4:
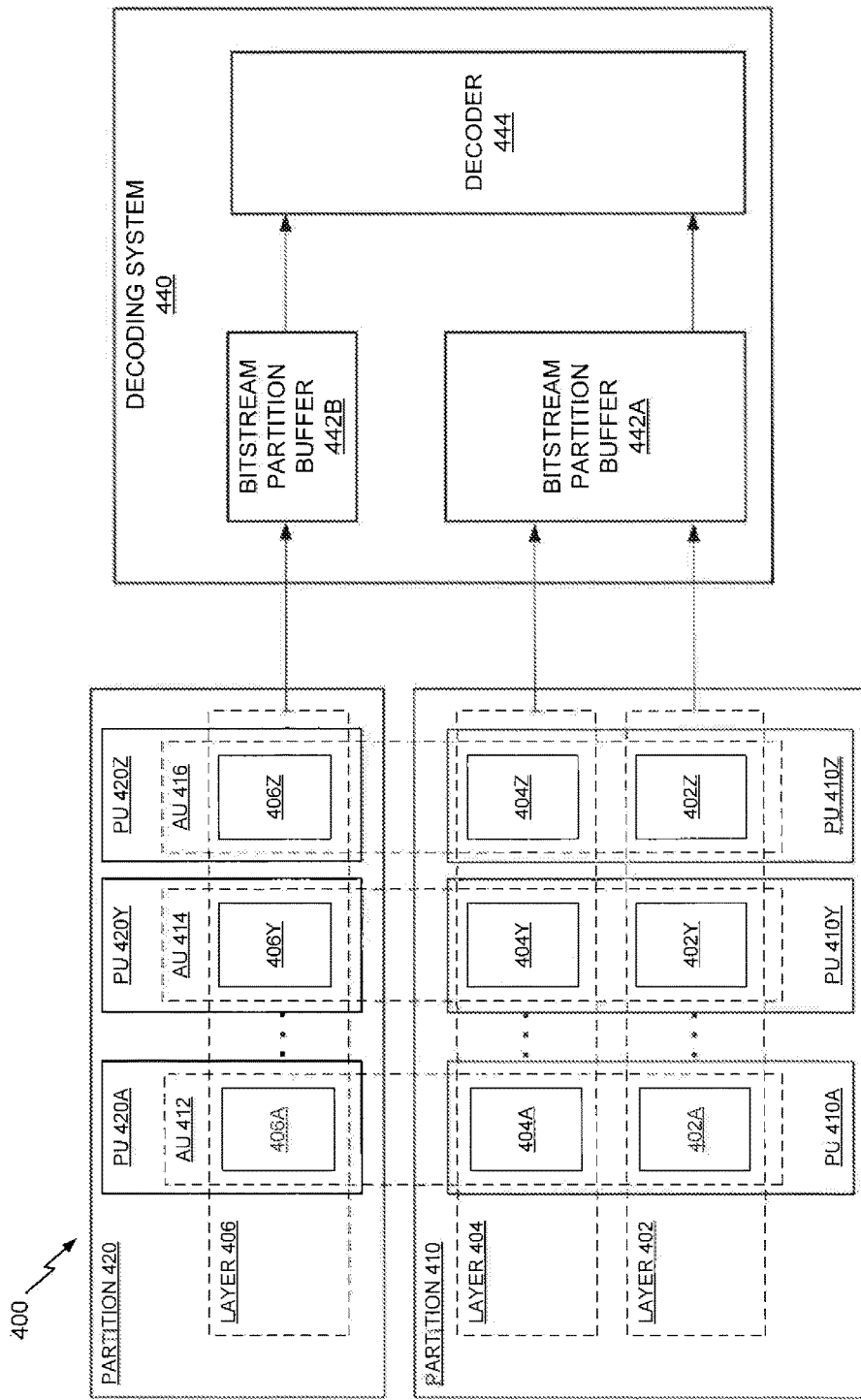
FIG. 4 is a block diagram illustrating an example configuration of pictures in different bitstream partitions.

An example bitstream containing two bitstream partitions is illustrated in FIG. 4. The bitstream 400 of FIG. 4 includes layers 402, 404, and 406. Layers 402 and 404 belong to bitstream partition 410, and layer 406 belongs to bitstream partition 420. Layer 402 and 404 are sent to BPB 442A of decoding system 440 and layer 406 is sent to BPB 442B of decoding system 440. Pictures are output from the BPBs 442A and 442B to decoder 444 and decoded by decoder 444. Although a decoding system 440 that includes multiple BPBs 442A and 442B and a single decoder 444 is illustrated in the example of FIG. 4, other configurations are possible, such as a decoding system including a single BPB and a single decoder, and a decoding system including multiple BPBs and multiple decoders. In some implementations, a decoder may determine variables that define which layers are to be processed by the decoder. For example, (i) a target output layer set index, which specifies which layers are to be decoded and output, and (ii) maximum temporal ID, which specifies how many temporal sublayers are to be decoded, effectively specifying the frame rate of the output pictures, may be provided to or otherwise determined by the decoder. Based on these variables and the available resources, the decoder may request a particular bitstream partition provided under one of the partitioning schemes defined by the encoder.

In some implementations, the bitstream may include a parameter specifying the removal time at which point a picture is to be removed from the CPB to be decoded. If such a parameter is not modified to refer to partition units (and instead specified for an AU in the bitstream), the value specified by the parameter may no longer make sense or may be sub-optimal (e.g., the removal times may to be delayed for some pictures), if the bitstream includes multiple partitions that are transported separately via different BPBs and are to be decoded by different decoders. Thus, such a parameter should be modified to refer to partition units instead of access units, where the pictures in a single partition unit are transported together.

Example Bitstream Parameter Processing

Figure 5:
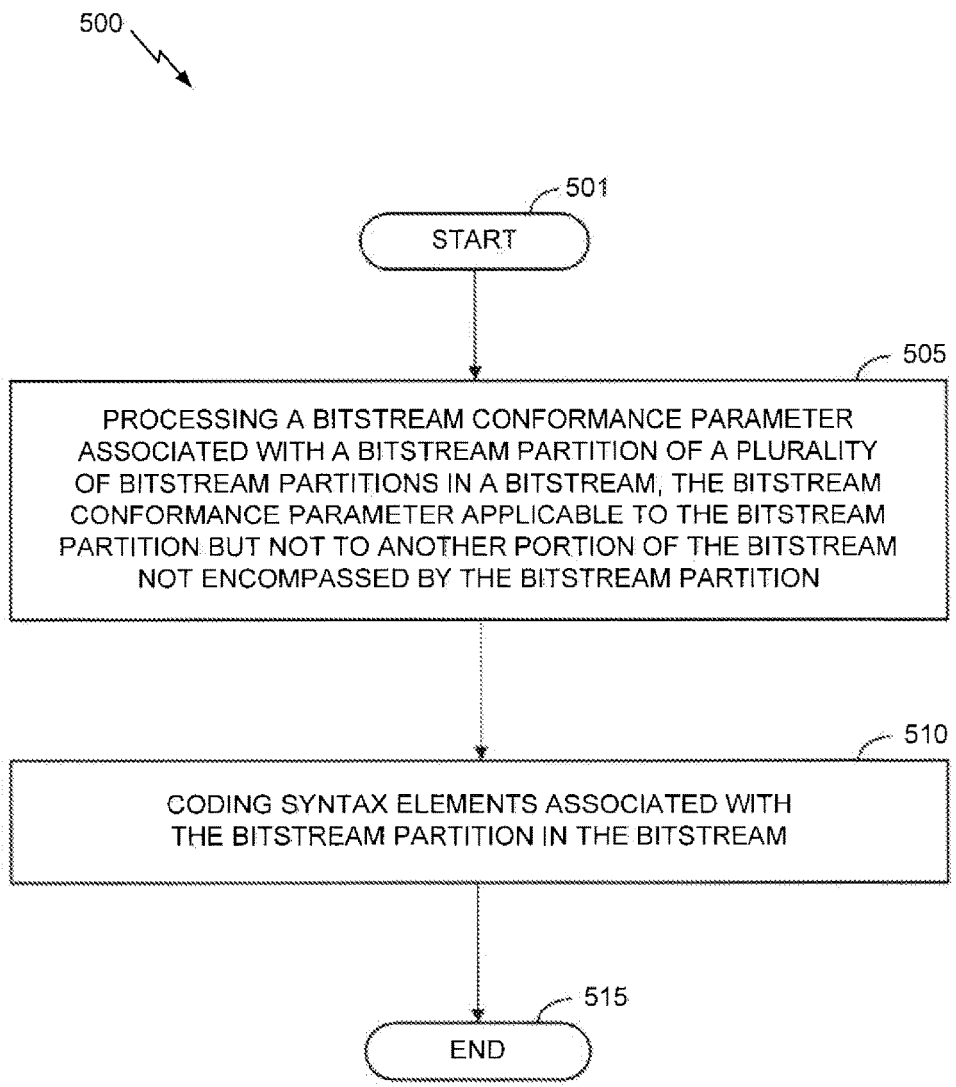
FIG. 5 is a low chart illustrating a method of processing a parameter associated with a bitstream partition.

With reference to FIG. 5, an example routine for processing a parameter associated with a bitstream partition will be described. FIG. 5 is a flowchart illustrating a method 500 for coding video information, according to an embodiment of the present disclosure. The method 500 may be performed by an encoder the video encoder as shown in FIG. 2A or FIG. 2B), a decoder (e.g., the video decoder as shown in FIG. 3A or FIG. 3B), or any other component. For convenience, the method 500 is described as performed by a coder, which may be the encoder, the decoder, or another component.

The method 500 begins at block 501. At block 505, the coder processes a bitstream conformance parameter associated with a bitstream partition of a plurality of bitstream partitions in a bitstream. The bitstream conformance parameter may be applicable to the bitstream partition but not to another portion of the bitstream not encompassed by the bitstream partition (e.g., other layers in the bitstream that do not belong to the bitstream partition). For example, such a parameter may be related to the timing information related to one or more pictures in the bitstream partition (e.g., when a picture in the bitstream partition is received by the decoding system, when a picture stored in the BPB is to be output to be decoded, etc.). In another example, the parameter may specify certain characteristics common to all the pictures in the bitstream partition or in a single partition unit of the bitstream partition. The parameter may also represent a bitstream conformance constraint applicable to a particular partition unit. The particular partition unit may include VCL NAL units of an AU that belong to the video layers contained in the bitstream partition and other non-VCL NAL units associated with the VCL NAL units.

In some embodiments, the bitstream may include an access unit including a plurality of NAL units in the bitstream and a partition unit including a subset of the plurality of NAL units of the access unit that belong to the bitstream partition. The bitstream conformance parameter may be associated with the partition unit, and the bitstream conformance parameter may be applicable to the subset of the plurality of NAL units of the partition unit but not to other NAL units of the access unit that are not encompassed by the partition unit (e.g., NAL units that are part of other layers that belong to other bitstream partitions). The bitstream conformance parameter may specify a number of decoding units in the bitstream that are associated with the partition unit, where the number of decoding units specified by the bitstream conformance parameter exceeds a maximum number of decoding units that can fit in a single picture. The smallest size of the decoding units may be coding tree blocks (CTBs). In some embodiments, the number of decoding units specified by the bitstream conformance parameter may not exceed a maximum value equal to a maximum number of CTBs that can fit in the partition unit. At block 510, the coder codes (e.g., encodes or decodes) syntax elements associated with the bitstream partition in the bitstream. The method 500 ends at 515.

As discussed above, one or more components of video encoder 20 of FIG. 2A, video encoder 23 of FIG. 2B, video decoder 30 of FIG. 3A, or video decoder 33 of FIG. 3B may be used to implement any of the techniques discussed in the present disclosure, such as processing a bitstream conformance parameter associated with a bitstream partition of a plurality of bitstream partitions in a bitstream, and coding the syntax elements associated with the bitstream partition in the bitstream.

Decoding Units

In some implementations, the bitstream is divided into a plurality of decoding units, where each decoding unit is defined as either an entire AU, or a set of consecutive VCL NAL units in the AU and their associated non-VCL NAL units. Under a partitioning scheme that places two adjacent layers (e.g., layers having consecutive layer ID's) in different bitstream partitions, a given decoding unit that spans the entire AU may introduce ambiguity regarding how the bitstream partitions should be transported (e.g., whether they can be transported separately or whether they need to be transported together) for any bitstream partition that contains the VCL NAL units included in the given decoding unit.

In some embodiments, in order to resolve this clarity issue, a decoding unit may be defined as either an entire AU or a subset thereof, where the AU or the subset thereof contains those VCL NAL units that belong to a single bitstream partition and the non-VCL NAL units associated with such VLC NAL units.

In some implementations each AU contains a single coded picture, and the decoding process is carried out on a picture-by-picture basis. In other implementations, each picture contains a plurality of decoding units, and the decoder decodes the decoding units as soon as they are received, without waiting for the entire coded picture to be received, thereby achieving a reduced latency. Such implementations may be referred to as ultra-low-delay models. However, when bitstream partitions may be transported independently or separately, decoding units encompassing multiple bitstream partitions may not be able to be immediately decoded if a portion of the decoding unit is transported separately in a different bitstream or transported to a different decoding system. Thus, it may be beneficial to provide a bitstream conformance constraint that specifies that a decoding unit cannot span multiple bitstream partitions, or to define decoding units such that they do not span multiple bitstream partitions.

Maximum Number of Decoding Units

In some implementations, SEI messages may provide certain supplemental information related to the bitstream, some of which may be optional. Some of such SEI messages may provide bitstream conformance constraints, such as a buffering period SEI message, a picture timing SEI message, a decoding unit information SEI message, etc. which may be needed to be present in order to determine whether a bitstream conforms to a given standard or not (e.g., SHVC). For example the picture timing SEI message may specify the number of decoding units that may be present in a single AU. For example, in the case of a bitstream having a single layer, if each picture in the layer has a size of 640 pixels by 640 pixels, and each coding tree block (CTB), which is the smallest individually decodable unit, has a size of 64 pixels by 64 pixels, the maximum number of decoding units in any AU may be 10*10=100. Thus, the value specified in the picture timing SEI message that indicates the number of decoding units in a single AU may be constrained to be in the range from 1 to (the picture size in CTB's), inclusive. In other words, if the picture timing SEI message specifies a value for the number of decoding units in a single AU that is outside of this range, the bitstream containing the picture timing SEI message may be determined not to be conformant to the particular standard (e.g., SHVC).

However, in a multi-layer case, the AU (or partition unit if the bitstream is divided into bitstream partitions) may contain more than one picture, and consequently, each AU may contain more decoding units that the maximum value calculated based on the assumption that each AU contains a single picture. Thus, the constraint provided in the picture timing SEI message should be modified to specify that the value of the variable indicating the number of decoding units in a single AU (if the SEI message is associated with an AU) is to be in the range from 1 to (the number of CTB's that can fit inside all the pictures in the AU). Similarly, the constraint provided in the picture timing SEI message should be modified to specify that the value of the variable indicating the number of decoding units in a single partition unit (if the SEI message is associated with a partition unit) is to be in the range from 1 to (the number of CTB's that can fit inside all the pictures in the partition unit). In the example above, if the partition unit contains two pictures, the maximum number of decoding units that may be specified by the picture timing SEI message in a conforming bitstream would be 200.

Constraints Based on Bitrate and Temporal ID

In some implementations, a constant bitrate CPB model is used, where the bitstream arrives at a fixed bitrate. In other implementations, a variable bitrate CPB model is used, where the bitstream arrives at a variable bitrate. For example, in such implementations using the variable bitrate CPB model, the rate at which the bitstream is received at the decoder side may be constant for a period of time and/or become zero for yet another period of time.

In some existing coding schemes, a bitstream conformance constraint specifies that the value of a decoding unit CPB removal time of a particular decoding unit is to be greater than the decoding unit CPB removal time of all decoding units that precede the particular decoding unit in decoding order. Such coding schemes may apply the bitstream conformance constraint only in implementations using the constant bitrate CPB model. However, such a bitstream conformance constraint may ensure that the decoding units are decoded in the correct decoding order. Thus, such a bitstream conformance constraint should be extended to implementations using the variable bitrate CPB model.

In some existing coding schemes, such a bitstream conformance constraint is not applied to decoding units within the lowest bitstream partition. The lowest bitstream partition may be a bitstream partition containing the base layer of the bitstream and/or containing the video layer having the lowest layer ID. Similarly, such a bitstream conformance constraint should be applied to decoding units within time lowest bitstream partition.

Intra Random Access Point (IRAP) Pictures

Some video coding schemes may provide various random access points throughout the bitstream such that the bitstream may be decoded starting from any of those random access points without needing to decode any pictures that precede those random access points in the bitstream. In such video coding schemes, all pictures that follow a random access point in output order (e.g., including those pictures that are in the same access unit as the picture providing the random access point) can be correctly decoded without using any pictures that precede the random access point. For example, even if a portion of the bitstream is lost during transmission or during decoding, a decoder can resume decoding the bitstream starting from the next random access point. Support for random access may facilitate, for example, dynamic streaming services, seek operations, channel switching, etc.

In some coding schemes, such random access points may be provided by pictures that are referred to as intra random access point (IRAP) pictures. For example, a random access point (e.g., provided by an enhancement layer IRAP picture) in an enhancement layer ("layerA") contained in an access unit ("auA") may provide layer-specific random access such that for each reference layer ("layerB") of layerA (e.g., a reference layer being a layer that is used to predict layerA) having a random access point contained in an access, unit ("auB") that is in layerB and precedes auA in decoding order (or a random access point contained in auA), the pictures in layerA that follow auB in output order (including those pictures located in auB), are correctly decodable without needing to decode any pictures in layerA that precede auB.

IRAP pictures may be coded using intra prediction (e.g., coded without referring to other pictures) and/or inter-layer prediction, and may include, for example, instantaneous decoder refresh (IDR) pictures, clean random access (CRA) pictures, and broken link access (BLA) pictures. When there is an IDR picture in the bitstream, all the pictures that precede the IDR picture in decoding order are not used for prediction by pictures that follow the IDR picture. When there is a CRA picture in the bitstream, the pictures that follow the CRA picture may or may not use pictures that precede the CRA picture in decoding order for prediction. Those pictures that follow the CRA picture in decoding order but use pictures that precede the CRA picture in decoding order may be referred to as random access skipped leading (RASL) pictures. Another type of picture that can follow an IRAP picture in decoding order and precede it in output order is a random access decodable leading (RADL) picture, which may not contain references to any pictures that precede the IRAP picture in decoding order. RASL pictures may be discarded by the decoder if the pictures that precede the CRA picture are not available. A BLA picture indicates to the decoder that pictures that precede the BLA picture may not be available to the decoder (e.g., because two bitstreams are spliced together and the BLA picture is the first picture of the second bitstream in decoding order). An access unit (e.g., a group of pictures consisting of all the coded pictures associated with the same output time across multiple layers) containing a base layer picture (e.g., having a layer ID value of 0) that is an IRAP picture may be referred to as an IRAP access unit.

Cross-Layer Alignment of IRAP Pictures

In some implementations of scalable video coding, IRAP pictures may not be required to be aligned (e.g., contained in the same access unit) across different layers. For example, if IRAP pictures were required to be aligned, any access unit containing at least one IRAP picture would only contain IRAP pictures. On the other hand, if IRAP pictures were not required to be aligned, in a single access unit, one picture (e.g., in a first layer) may be an IRAP picture, and another picture (e.g., in a second layer) may be a non-IRAP picture. Having such non-aligned IRAP pictures in a bitstream may provide some advantages. For example, in a two-layer bitstream, if there are more IRAP pictures in the base layer than in the enhancement layer, in broadcast and multicast applications, low tune-in delay and high coding efficiency can be achieved.

Bitstream Including a Splice Point

Figure 6:
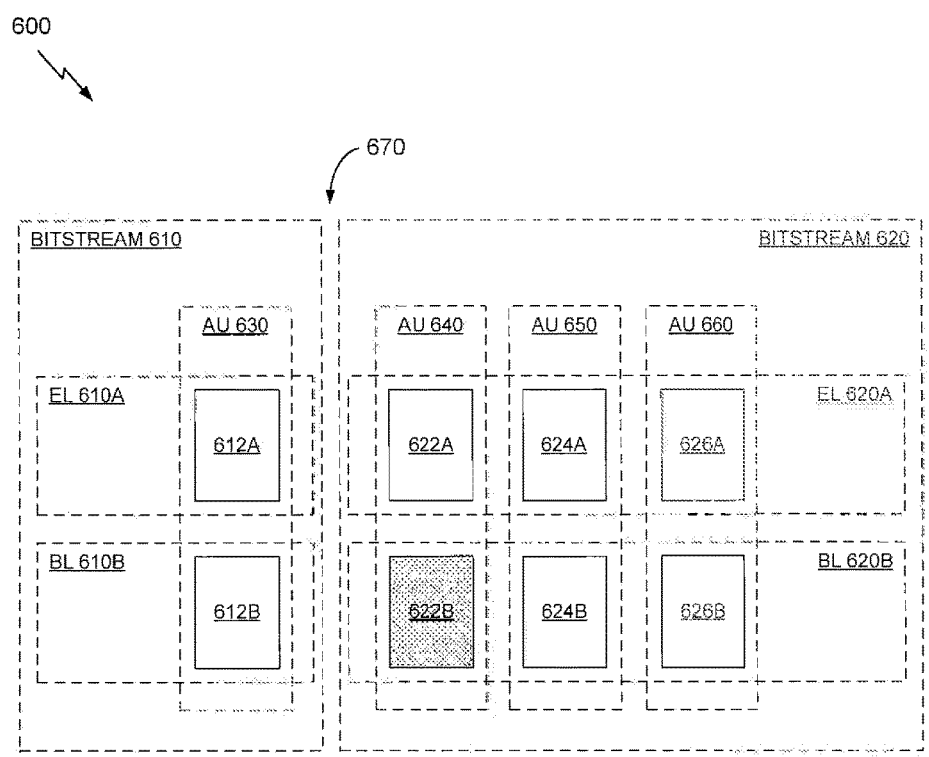
FIG. 6 is a flow chart illustrating a method of determining whether a bitstream conformance constraint is satisfied.

With reference to FIG. 6, an example bitstream having a splice point will be described. FIG. 6 shows a multi-layer bitstream 600 created by splicing bitstreams 610 and 620. The bitstream 610 includes an enhancement layer (EL) 610A and a base layer (BE) 610B, and the bitstream 620 includes an EL 620A and a EL 620B. The EL 610A includes an EL picture 612A, and the 610B includes a EL picture 612B. The EL 620A includes EL pictures 622A, 624A, and 626A, and the BL 620B includes BL pictures 622B, 624B and 626B. The multi-layer bitstream 600 further includes access units (AUs) 630-660. The AU 630 includes the EL picture 612A and the BL picture 612B, the AU 640 includes the EL picture 622A and the BL picture 622B, the AU 650 includes the EL picture 624A and the BL picture 624B, and the AU 660 includes the EL picture 626A and the EL picture 626B. In the example of FIG. 6, the BL picture 622B is an IRAP picture, and the corresponding EL picture 622A in the AU 640 is a trailing picture (e.g., a non-IRAP picture), and consequently, the AU 640 is a non-aligned IRAP AU. Also, it should be noted that the AU 640 is an access unit that immediately follows a splice point 670.

Although the example of FIG. 6 illustrates a case where two different bitstreams are joined together, in some embodiments, a splice point may be present when a portion of the bitstream is removed. For example, a bitstream may have portions A, B, and portion B being between portions A and C. If portion B is removed from the bitstream, the remaining portions A and C may be joined together, and the point at which they are joined together may be referred to as a splice point. More generally, a splice point as discussed in the present application may be deemed to be present when one or more signaled or derived parameters or flags have predetermined values. For example, without receiving a specific indication that a splice point exists at a particular location, a decoder may determine the value of a flag (e.g., NoClrasOutputFlag, which may indicate that cross-layer random access skip pictures are not to be output if set to 1 and indicates that cross-layer random access skip pictures are to be output if set to 0), and perform one or more techniques described in this application based on the value of the flag.

POC

In some video coding schemes, a POC may be used to keep track of the relative order in which the decoded pictures are outputted. This value may be a very large number (e.g., 32 bits), and each slice header may include the POC of the picture associated with the slice. Thus, in some implementations, only the least significant bits (LSB) of the POC are signaled in the bitstream and the most significant bits (MSB) of the POC are calculated based on a POC derivation process. For example, in order to save bits, the LSB may be signaled in the slice header, and the MSB may be computed by the encoder or the decoder based on the NAL unit type of the current picture and the MSB and LSB of one or more previous pictures in decoding order that (i) are not RASL or RADL pictures, (ii) are not discardable (e.g., pictures marked as "discardable," indicating that no other picture depends on them, thereby allowing them to be dropped to satisfy bandwidth constraints), (iii) are not sub-layer non-reference pictures (e.g., pictures that are not used for reference by other pictures in the same temporal sub-layer or the same layer), and (iv) have a temporal ID temporal sub-layer ID) value equal to 0.

In the case where only the LSB, are provided in the bitstream, bitstream conformance constraint may be provided to ensure that the POC values of any decoded pictures in the DPB are not separated by more than a unit value of the MSB or a "cycle". For example, if the DPB contains pictures having POC values of 1 and 257, respectively, where the LSB is represented in 8 bits, it may be deceiving for the two pictures to have the same LSB value (e.g., 1) when one should precede the other in output order based on their POC values. Thus, in some embodiments, a bitstream conformance constraint may specify that any two pictures in the DPB shall not have POC values that differ by more than the cycle length divided by 2. For example, such pictures may include (i) the current picture; (ii) the previous picture in decoding order that has TemporalId value equal to 0 and that is not a RASL picture, a RADL picture, or a sub-layer non-reference picture; (iii) the short-term reference pictures in the RPS of the current picture; and (iv) the pictures that have a PicOutputFlag value equal to 1 and precede the current picture in decoding order. In the multi-layer case, this bitstream conformance constraint is applied to each sub-DPB. For example, a DPB may contain multiple sub-DPBs, each sub-DPB storing pictures in a single layer. In such a case, the bitstream conformance constraint should be modified to specify that the POC values of decoded pictures in a sub-DPB should not be separated by more than a particular value (e.g., by more than a cycle length or by more than a cycle length divided by 2).

In some embodiments, the constraint is restricted to a single CVS (e.g., not applied across multiple CVS's). In some embodiments, the constraint is not applied across a current picture that is an IRAP picture with a NoRaslOutputFlag value equal to 1 or is the first picture of the current layer with nuh_layer_id greater than 0 that follows an IRAP picture that has a nuh_layer_id value equal to 0 and has a NoClrasOutputFlag value equal to 1. In other words, the difference between the maximum and the minimum POC values of pictures in the above list, as applied to each sub-DPB, is constrained to be less than MaxPicOrderCntLsb/2 only if the coder determines that the current picture is (i) not an IRAP picture with a NoRaslOutputFlag value equal to 1 or (ii) is not the first picture of the current layer with nuh_layer_id greater than 0 that follows an IRAP picture that has a nuh_layer_id value equal to 0 and has a NoClrasOutputFlag value equal to 1, if the coder determines that the condition is not satisfied, the coder may refrain from checking the bitstream conformance constraint. Alternatively, the bitstream conformance constraint above may only be applied when the current picture is not an IRAP picture with a NoRaslOutputFlag value equal to 1 and the POC MSB value is not signalled or is not the first picture of the current layer with nuh_layer_d greater than 0 that follows an IRAP picture that has a nuh_layer_id value equal to 0 and has a NoClrasOutputFlag value equal to 1.

Example DPB POC Value Processing

Figure 7:
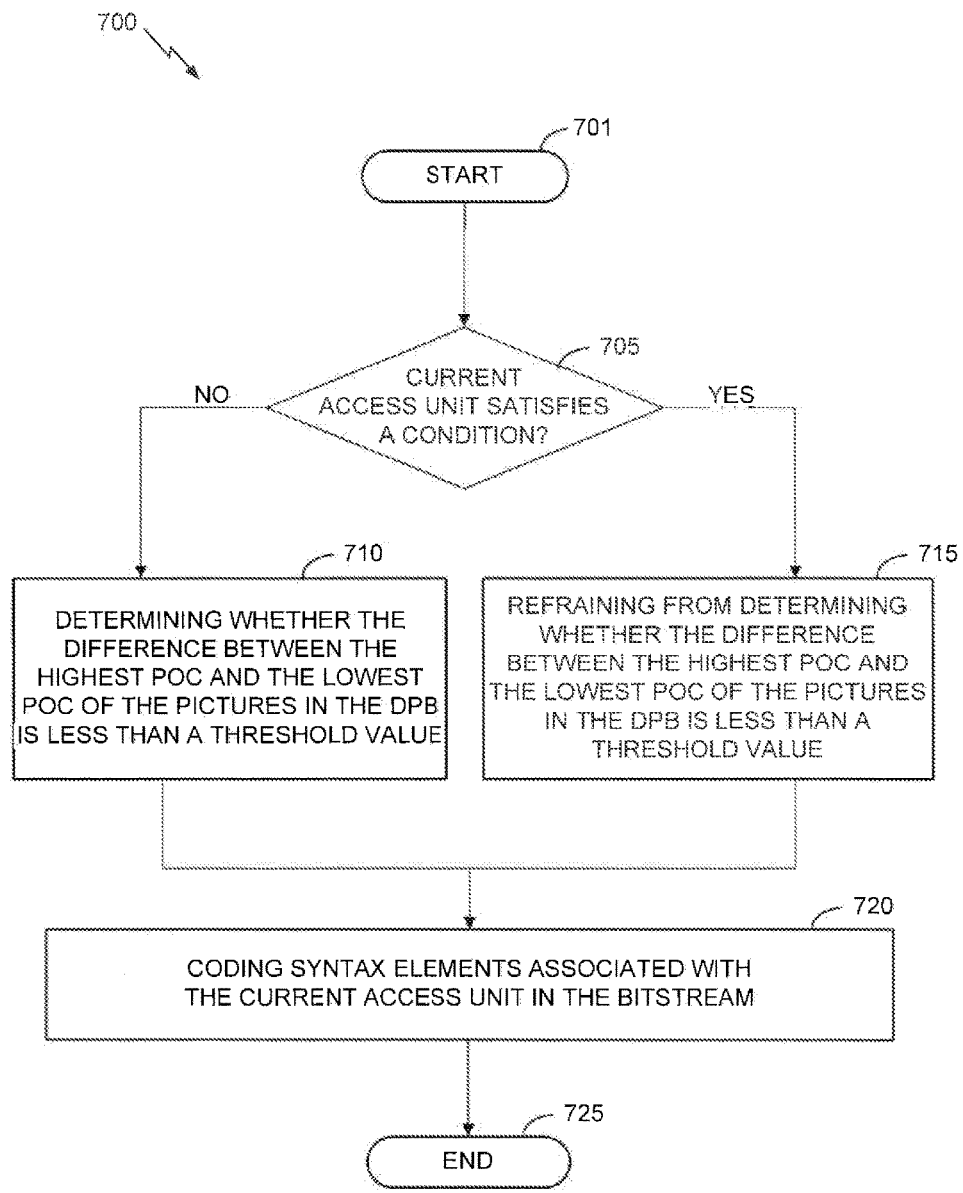
FIG. 7 is a block diagram illustrating an example configuration of pictures across a splice point in different layers.

With reference to FIG. 7, an example routine for determining whether a bitstream conformance constraint is satisfied will be described. FIG. 7 is a flowchart illustrating a method 700 for coding video information, according to an embodiment of the present disclosure. The steps illustrated in FIG. 7 may be performed by an encoder (e.g., the video encoder as shown in FIG. 2A or FIG. 2B), a decoder (e.g., the video decoder as shown in FIG. 3A or FIG. 3B), or any other component. For convenience, method 700 is described as performed by a coder, which may be the encoder, the decoder, or another component.

The method 700 begins at block 701. At block 705, the coder determines whether a current ALT satisfies a condition associated with a first layer. For example, the coder may make such a determination by determining whether a current picture in the current AU is an IRAP picture associated with a flag indicating that any picture that follows the first picture in decoding order but uses a picture that precedes the first picture in decoding order is not to be output (e.g., NoRaslOutputFlag value equal to 1). In another example, the coder may make such a determination by processing a flag or syntax element associated with a second picture, where the second picture is in a base layer having the lowest layer ID (e.g., nuh_layer_id value equal to 0). In such an example, the second picture may be in an AU that immediately precedes the current AU. The flag or syntax element may be NoClrasOutputFlag, which may indicate that cross-layer random access skip pictures are not to be output if set to 1 and indicates that cross-layer random access skip pictures are to be output if set to 0. In such an example, a flag or syntax element value of 1 may indicate that the picture is in an access unit that immediately follows a splice point, and a flag or syntax element value of 0 may indicate that the picture is not in an access unit that immediately follows a splice point. In some embodiments, the flag or syntax element may indicate one of (i) whether the second picture is the first picture in the bitstream (e.g., appearing before other pictures in the bitstream, whether the second picture is included in the first access unit that follows an access unit including an end of sequence NAL unit with a nuh_layer_d value equal to a SmallestLayerId value or 0 in decoding order, (iii) whether the second picture is a BLA picture or a CRA picture with a HandleCraAsBlaFlag value equal to 1, or (iv) whether the second picture is an IDR picture with a cross_layer_bla_flag value equal to 1.

If the coder determines that current AU does not satisfy the condition, the method 700 proceeds to block 710. If the coder determines that current AU satisfies the condition, the method 700 proceeds to block 715. At block 710, the coder determines whether the difference between the highest POC and the lowest POC of the pictures in the DPB is less than a threshold value. For example, the pictures may include (i) the current picture; (ii) the previous picture in decoding order that has a TemporalId value equal to 0 and that is not a RASL picture, a RADL picture, or a sub-layer non-reference picture; (iii) the short-term reference pictures in the RPS of the current picture; and/or (iv) the pictures that have a PicOutputFlag value equal to 1, precede the current picture in decoding order, and succeed the current picture in output order. At block 715, the coder refrains from determining whether the difference between the highest POC and the lowest POC of the pictures in the DPB is less than the threshold value. For example, the bitstream conformance constraint is not applied to pictures across a splice point. In another example, the bitstream conformance constraint is not applied to a picture that is an IRAP picture with a NoRaslOutputFlag value equal to 1 or is the first picture of the current layer with nuh_layer_id greater than 0 that follows an IRAP picture that has a nuh_layer_id value equal to 0 and has a NoClrasOutputFlag value equal to 1. At block 720, the coder codes (e.g., encodes or decodes) syntax elements associated with the current AU in the bitstream. The method 700 ends at 725.

As discussed above, one or more components of video encoder 20 of FIG. 2A, video encoder 23 of FIG. 2B, video decoder 30 of FIG. 3A, or video decoder 33 of FIG. 3B may be used to implement any of the techniques discussed in the present disclosure, such as determining whether the current AU satisfies a condition, determining whether the difference between the highest POC and the lowest POC of the pictures in the DPB is less than a threshold value, and coding the syntax elements associated with the current access unit in the bitstream.

POC Reset

In some implementations, the value of the POC may be reset (e.g., set to zero, set to some value signaled in the bitstream, or derived from information included in the bitstream) whenever certain types of pictures appear in the bitstream. For example, when certain random access point pictures appear in the bitstream the POC may be reset. When the POC of a particular picture is reset, the POCs of any pictures that precede the particular picture in decoding order may also be reset, for example, to maintain the relative order in which those pictures are to be output or displayed. Also, decoded pictures, each of which may be associated with a particular POC value, may later be removed from the DPB.

Example of POC Reset

With reference to FIGS. 8-11, example processes for resetting the POC values (e.g., the LSB and the MSB) will be described. As described above, in some coding schemes, certain conformance constraints may specify that the POC of all coded pictures in a single AU should be the same. Without appropriate resets of the POC values, non-aligned IRAP AUs in the bitstream may produce POC values that violate such conformance constraints.

Figures 8, 9:
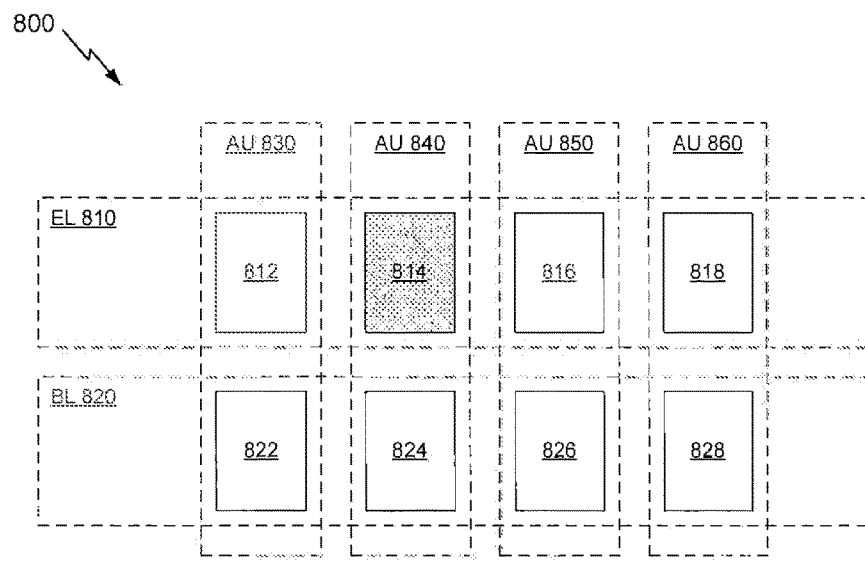
FIG. 8 is a block diagram illustrating an example configuration of pictures in different layers.
FIG. 9 is a table illustrating picture order count (POC) values of pictures in different layers.

FIG. 8 shows a multi-layer bitstream 800 including an enhancement layer (EL) 810 and a base layer (BL) 820. The EL 810 includes EL pictures 812-818, and the BL includes BL pictures 822-828. The multi-layer bitstream 800 further includes access units (AUs) 830-860. The AU 830 includes the EL picture 812 and the DL picture 822, the AU 840 includes the EL picture 814 and the EL picture 824, the AU 850 includes the EL picture 816 and the BL picture 826, and the AU 860 includes the EL picture 818 and the BL picture 828. In the example of FIG. 8, the EL picture 814 is an IDR picture, and the corresponding BL picture 824 in the AU 840 is a trailing picture (e.g., a non-IRAP picture), and consequently, the AU 840 is a non-aligned IRAP AU. In some embodiments, an MSB reset is performed at a given picture if the picture is an IDR picture that is not in the base layer. Such an IDR picture may have a non-zero POC LSB value.

FIG. 9 shows a table 900 that illustrates the POC values that may be signaled or derived in connection with the multi-layer bitstream 800 of FIG. 8. As shown in FIG. 9, the MSB of the POC in the EL 810 is reset at the EL picture 814, while the MSB of the POC in the BL 820 is not reset. Thus, if a reset is not performed in the BL 820 at the BL picture 824 in the non-aligned IRAP AU 840, the POC values of BL pictures and the EL pictures in the AUs 840-860 would not match (i.e., be equivalent) as specified by the conform ace constraints. The differences in the POC values with and without a reset are highlighted in bold in FIG. 9.

Figures 10, 11:
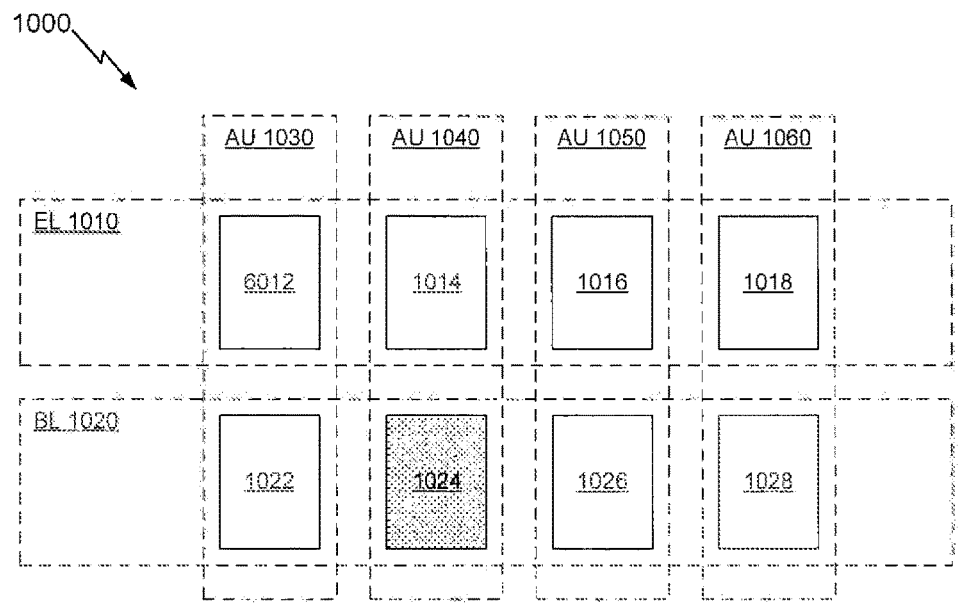
FIG. 10 is a block diagram illustrating an example configuration of pictures in different layers.
FIG. 11 is a table illustrating POC values of pictures in different layers.

FIG. 10 shows a multi-layer bitstream 1000 including an enhancement layer (EL) 1010 and a base layer (BL) 1020. The EL 1010 includes EL pictures 1012-1018, and the BL includes BL pictures 1022-1028. The multi-layer bitstream 1000 further includes access units (AUs) 1030-1060. The AU 1030 includes the EL picture 1012 and the BL picture 1022, the AU 1040 includes the EL picture 1014 and the BL picture 1024, the AU 1050 includes the EL picture 1016 and the BL picture 1026, and the AU 1060 includes the EL picture 1018 and the BL picture 1028. In the example of FIG. 10, the BL picture 1024 is an IDR picture, and the corresponding EL picture 1014 in the AU 1040 is a trailing picture (e.g., a non-IRAP picture), and consequently, the AU 1040 is a nonaligned IRAP AU. In some embodiments, an MSB reset and an LSB reset are performed for a given picture if the picture is an IDR picture that is in the base layer. For example, the bitstream may include an indication that the POC MSB and the POC LSB of such a BL IDR picture should be reset. Alternatively, the decoder may perform the reset of the POC MSB and the POC LSB of such a BL IDR picture without any indication in the bitstream that a POC reset should be performed.

FIG. 11 shows a table 1100 that illustrates the POC values that may be signaled or derived in connection with the multi-layer bitstream 1000 of FIG. 10. As shown in FIG. 11, the MSB and the LSB of the POC in the BL 1020 is reset at the BL picture 1024, while neither the MSB nor the LSB of the POC in the EL 1010 is reset. Thus, if a reset of the MSB and the LSB of the POC is not performed in the EL 1010 at the EL picture 1014 in the non, aligned IRAP AU 1040, the POC values of EL pictures and the EL pictures in the AUs 1040-1060 would not match as specified by the conformance constraints. The differences in the POC values with and without a reset are highlighted in bold in FIG. 11.

The embodiments described herein are not limited to the example bitstream configurations illustrated in FIGS. 8 and 10, and the techniques described herein may be extended to any multi-layer bitstream having any number of layers, access units, and pictures. Also, in the examples illustrated in FIGS. 8-11, the LSB of the POC is represented using seven bits. However, the techniques described herein may be extended to scenarios having any forms of POC value representation.

Consequence of POC Reset or Removal from DPB

In some implementations, a bitstream conformance constraint specifies that for two pictures m and n within a coded video sequence (CVS), if DpbOutputTime[m] is greater than DpbOutputTime[n], PicOrderCntVal of picture m shall also be greater than PicOrderCntVal of picture n. However, whether such a constraint is satisfied becomes unclear if the PicOrderCntVal of the picture m or picture n or a picture in between has been reset, since the constraint does not specify what value of PicOrderCntVal of the pictures should be used to test the constraint. Further, it may be unclear how the bitstream conformance constraint should be satisfied if one of the pictures to be tested has been removed from the DPB at the time of testing. Moreover, some restrictions of PicOrderCntVal should be applicable even across coded video sequences because the POC chain can continue in enhancement layers even across a CVS boundary. For example, a given AU may contain an IDR picture in the base layer and a non-IRAP picture in the enhancement layer. The IDR picture in the base layer breaks the POC chain in the base layer, but the non-IRAP picture in the enhancement layer does not break the POC chain in the enhancement layer (it may be desirable to use enhancement layer pictures that precede the given AU in decoding order for predicting the non-IRAP picture or other enhancement layer pictures that follow the non-IRAP picture in decoding order).

In some embodiments, the constraint on the DpbOutputTime and PicOrderCntVal may be updated as follows: Let picA be an IRAP picture with NoRaslOutputFlag equal to 1 and belonging to a layer layerA. Let auB be the earlier, in decoding order, of the first access unit containing IRAP picture with nuh_layer_id equal to 0 and NoClrasOutputFlag equal to 1 that succeeds picA in decoding order and the first access unit containing an IRAP picture with NoRaslOutputFlag equal to in layerA that succeeds picA in decoding order. For any two pictures picM and picN in the layer layerA contained in access units m and n, respectively, that either are picA or succeed picA in decoding order and precede auB in decoding order, when DpbOutputTime[n] greater than DpbOutputTime[n], PicOrderCntVal(picM) shall be greater than PicOrderCntVal(picN), where PicOrderCnt(picM) and PicOrderCnt(picN) are the PicOrderCntVal values picM and picN, respectively, immediately after the invocation of the decoding process for picture order count of the latter of picM and picN in decoding order. For example, the bitstream conformance constraint may be tested only immediately after the latter picture is decoded, and not at a later time. In some embodiments, picM precedes picN in decoding order. In other embodiments, picN precedes picM in decoding order.

Output Time of Successive Pictures

In some implementations, a bitstream conformance constraint (e.g., DpbOutputTime[ ], or other variables derived far each picture) specifies a lower bound of the output time (e.g., when a picture is removed from the DPB) of successive pictures in order to ensure that the actual frame rate of the output pictures does not exceed a specified maximum frame rate (e.g., 300 fps). However, a multi-layer bitstream may need to contain more than one picture that corresponds to the same output time (e.g., in a single AU). Thus, if the above bitstream conformance constraint of the single-layer case were applied to the multi-layer case, each AU may only contain a single picture, which may be undesirable. Thus, the output time constraint should be applied to pictures in different AU's.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM) non-volatile random access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, ASICs, FPGAs, or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with as DSP core, or any other such configuration. Accordingly, the term "processor," as used herein may refer to any of the foregoing, structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set) Various components, modules, or units are described in this disclosure to emphasize functional aspects of devices configured to perform the disclosed techniques, but do not necessarily require realization by different hardware units. Rather, as described above various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus for coding video information in a bitstream, comprising:
    a memory configured to store video information associated with a current layer including a current picture of a plurality of pictures and a base layer different from the current layer; and
    a processor in communication with the memory and configured to:
        determine whether the current picture is the first picture in the current layer that follows an intra random access point (IRAP) picture that is (i) in the base layer and (ii) associated with a specific flag value; and
        based on a determination that the current picture is not the first picture in the current layer that follows an IRAP picture that is (i) in the base layer and (ii) associated with the specific flag value, signal respective picture order counts (POCs) of the plurality of pictures such that a difference between a highest POC of the respective POCs and a lowest POC of the respective POCs is less than a threshold value.

2. The apparatus of claim 1, wherein the processor is further configured to signal the respective POCs such that the difference between the highest POC and the lowest POC is less than the threshold value based on a determination that the current picture is not an IRAP picture associated with a flag indicating that any picture that follows the current picture in decoding order but may use a picture that precedes the current picture in decoding order for reference is not to be output.

3. The apparatus of claim 1, wherein the processor is further configured to signal the respective POCs such that the difference between the highest POC and the lowest POC is less than the threshold value based on a determination that most significant bits (MSBs) of a POC of the current picture is not to be signaled and that the current picture is not an IRAP picture associated with a flag indicating that any picture that follows the current picture in decoding order but may use a picture that precedes the current picture in decoding order for reference is not to be output.

4. The apparatus of claim 1, wherein the plurality of pictures includes at least one picture that is not in a same access unit (AU) as the current picture.

5. The apparatus of claim 1, wherein the plurality of pictures includes one or more pictures that precede the current picture in decoding order, have temporal IDs values equal to 0, and are not random access skipped leading (RASL) pictures, random access decodable leading (RADL) pictures, or sub-layer non-reference pictures.

6. The apparatus of claim 1, wherein the plurality of pictures includes short-term reference pictures of the current picture.

7. The apparatus of claim 1, wherein the plurality of pictures includes all pictures that precede the current picture in decoding order and each associated with a flag indicating that the picture is to be output.

8. The apparatus of claim 1, wherein the processor is further configured to refrain, based on a determination that the current picture is either (i) the first picture in the current layer that follows the IRAP picture that is in the base layer and associated with the specific flag value or (ii) an IRAP picture associated with a flag indicating that any picture that follows the current picture in decoding order but may use a picture that precedes the current picture in decoding order for reference is not to be output, from determining whether the difference between the highest POC and the lowest POC of the plurality of pictures is less than the threshold value.

9. The apparatus of claim 1, wherein the processor is further configured to determine whether a third picture that either follows a fifth picture in decoding order or is in the same access unit (AU) as the fifth picture, precedes a current AU that satisfies a condition in decoding order, and has a decoded picture buffer (DPB) output time that is greater than a DPB output time of a fourth picture that either follows the fifth picture in decoding order or is in the same AU as the fifth picture, and precedes the current AU in decoding order has a POC that is greater than a POC of the fourth picture.

10. The apparatus of claim 9, wherein the third and fourth pictures belong to the current layer and the third picture precedes the fourth picture in decoding order.

11. The apparatus of claim 9, wherein the processor is further configured to:
    decode the fourth picture; and
    immediately after decoding the fourth picture, determine whether the third picture in the current layer that has a DPB output time that is greater than a DPB output time of the fourth picture has a POC that is greater than a POC of the fourth picture.

12. The apparatus of claim 9, wherein the processor is further configured to:
    decode the fourth picture;
    decode one or more other pictures in the current layer that follows the fourth picture in decoding order; and
    refrain from determining whether the third picture in the current layer that has a DPB output time that is greater than a DPB output time of the fourth picture has a POC that is greater than a POC of the fourth picture.

13. The apparatus of claim 1, wherein the processor is further configured to refrain from determining whether a decoded picture buffer (DPB) output time of a sixth picture in the same access unit (AU) as the current picture is less than a threshold value away from a DPB output time of the current picture.

14. A method for coding video information in a bitstream, comprising:
    determining whether a current AU including a current picture of a plurality of pictures that is in a current layer is the first picture in the current layer that follows an intra random access point (RAP) picture that is (i) in a base layer and (ii) associated with a specific flag value, wherein the base layer is different from the current layer;
    based on a determination that the current picture is not the first picture in the current layer that follows an IRAP picture that is (i) in the base layer and (ii) associated with the specific flag value, signaling respective picture order counts (POCs) of the plurality of pictures such that a difference between a highest POC of the respective POCs and a lowest POC of the respective POCs is less than a threshold value; and coding syntax elements associated with the current AU in the bitstream.

15. The method of claim 14, further comprising signaling the respective POCs such that the difference between the highest POC and the lowest POC is less than the threshold value based on a determination that the current picture is not an IRAP picture associated with a flag indicating that any picture that follows the current picture in decoding order but uses a picture that precedes the current picture in decoding order for reference is not to be output.

16. The method of claim 14, further comprising signaling the respective POCs such that the difference between the highest POC and the lowest POC is less than the threshold value based on a determination that most significant bits (MSBs) of a POC of the current picture is not to be signaled and that the current picture is not an IRAP picture associated with a flag indicating that any picture that follows the current picture in decoding order but may use a picture that precedes the current picture in decoding order for reference is not to be output.

17. The method of claim 14, wherein the plurality of pictures includes at least one picture that is not in a same access unit (AU) as the current picture.

18. The method of claim 14, wherein the plurality of pictures includes one or more pictures that precede the current picture in decoding order, have temporal IDs values equal to 0, and are not random access skipped leading (RASL) pictures, random access decodable leading (RADL) pictures, or sub-layer non-reference pictures.

19. The method of claim 14, wherein the plurality of pictures includes short-term reference pictures of the current picture.

20. The method of claim 14, wherein the plurality of pictures includes all pictures that precede the current picture in decoding order and each associated with a flag indicating that the picture is to be output.

21. The method of claim 14, further comprising refraining, based on a determination that the current picture is either (i) the first picture in the current layer that follows the TRAP picture that is in the base layer and associated with the specific flag value or (ii) an IRAP picture associated with a flag indicating that any picture that follows the current picture in decoding order but may use a picture that precedes the current picture in decoding order for reference is not to be output, from determining whether the difference between the highest POC and the lowest POC of the plurality of pictures is less than the threshold value.

22. The method of claim 14, further comprising determining whether a third picture that either follows a fifth picture in decoding order or is in the same access unit (AU) as the fifth picture, precedes a current AU that satisfies a condition in decoding order, and has a decoded picture buffer (DPB) output time that is greater than a DPB output time of a fourth picture that either follows the fifth picture in decoding order or is in the same AU as the fifth picture, and precedes the current AU in decoding order has a POC that is greater than a POC of the fourth picture.

23. The method of claim 22, wherein the third and fourth pictures belong to the current layer and the third picture precedes the fourth picture in decoding order.

24. The method of claim 22, further comprising:
decoding the fourth picture; and
immediately after decoding the fourth picture, determining whether the third picture in the current layer that has a DPB output time that is greater than a DPB output time of the fourth picture has a POC that is greater than a POC of the current picture.

25. The method of claim 22, further comprising:
decoding the fourth picture;
decoding one or more other pictures in the current layer that follows the fourth picture in decoding order; and
refraining from determining whether the third picture in the current layer that has a DPB output time that is greater than a DPB output time of the fourth picture has a POC that is greater than a POC of the fourth picture.

26. The method of claim 14, further comprising refraining from determining whether a decoded picture buffer (DPB) output time of a sixth picture in the same access unit (AU) as the current picture is less than a threshold value away from a DPB output time of the current picture.

27. A non-transitory computer readable medium comprising code that, when executed, causes an apparatus to:
store video information associated with a current layer including a current picture of a plurality of pictures and a base layer different from the current layer;
determine whether the current picture is the first picture in the current layer that follows an intra random access point (IRAP) picture that is (i) in the base layer and (ii) associated with a specific flag value; and
based on a determination that the current picture is not the first picture in the current layer that follows an IRAP picture that is (i) in the base layer and (ii) associated with the specific flag value, signal respective picture order counts (POCs) of the plurality of pictures such that a difference between a highest POC of the respective POCs and a lowest POC of the respective POCs is less than a threshold value.

28. The computer readable medium of claim 27, wherein the code further causes the apparatus to determine whether a third picture that either follows a fifth picture in decoding order or is in the same access unit (AU) as the fifth picture, precedes a current AU that satisfies a condition in decoding order, and has a decoded picture buffer (DPB) output time that is greater than a DPB output time of a fourth picture that either follows the fifth picture in decoding order or is in the same AU as the fifth picture, and precedes the current AU in decoding order has a POC that is greater than a POC of the fourth picture.

29. A video coding device configured to code video information in a bitstream, the video coding device comprising:
means for storing video information associated with a current layer including a current picture of a plurality of pictures and a base layer different from the current layer;
means for determining whether the current picture is the first picture in the current layer that follows an intra random access point (IRAP) picture that is (i) in the base layer and (ii) associated with a specific flag value; and
means for signaling respective picture order counts (POCs) of the plurality of pictures such that a difference between a highest POC of the respective POCs and a lowest POC of the respective POCs is less than a threshold value, based on a determination that the current picture is not the first picture in the current layer that follows an IRAP picture that is (i) in the base layer and (ii) associated with the specific flag value.

30. The video coding device of claim 29, further comprising means for determining whether a third picture that either follows a fifth picture in decoding order or is in the same access unit (AU) as the fifth picture, precedes a current AU that satisfies a condition in decoding order, and has a decoded picture buffer (DPB) output time that is greater than a DPB output time of a fourth picture that either follows the fifth picture in decoding order or is in the same AU as the fifth picture, and precedes the current AU in decoding order has a POC that is greater than a POC of the fourth picture.

\* \* \* \* \*